March 14, 1961 G. W. RENGERT 2,974,546
CONSTANT REDUCED SPEED DRIVE UNIT
Filed Oct. 14, 1959 3 Sheets-Sheet 1

INVENTOR
George W. Rengert,

BY *Raymon E. Rousseau*
ATTORNEY

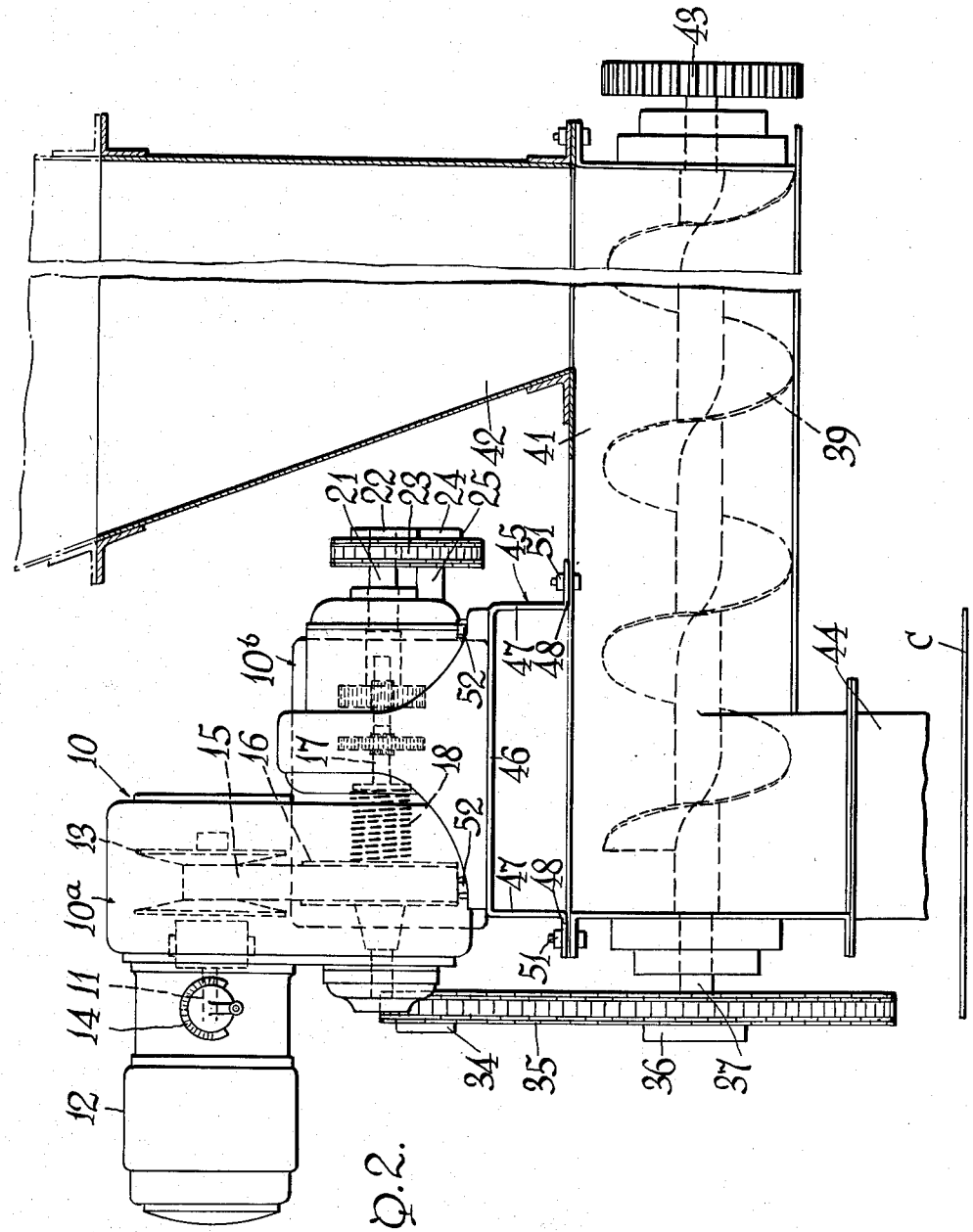

March 14, 1961 G. W. RENGERT 2,974,546
CONSTANT REDUCED SPEED DRIVE UNIT
Filed Oct. 14, 1959 3 Sheets-Sheet 3
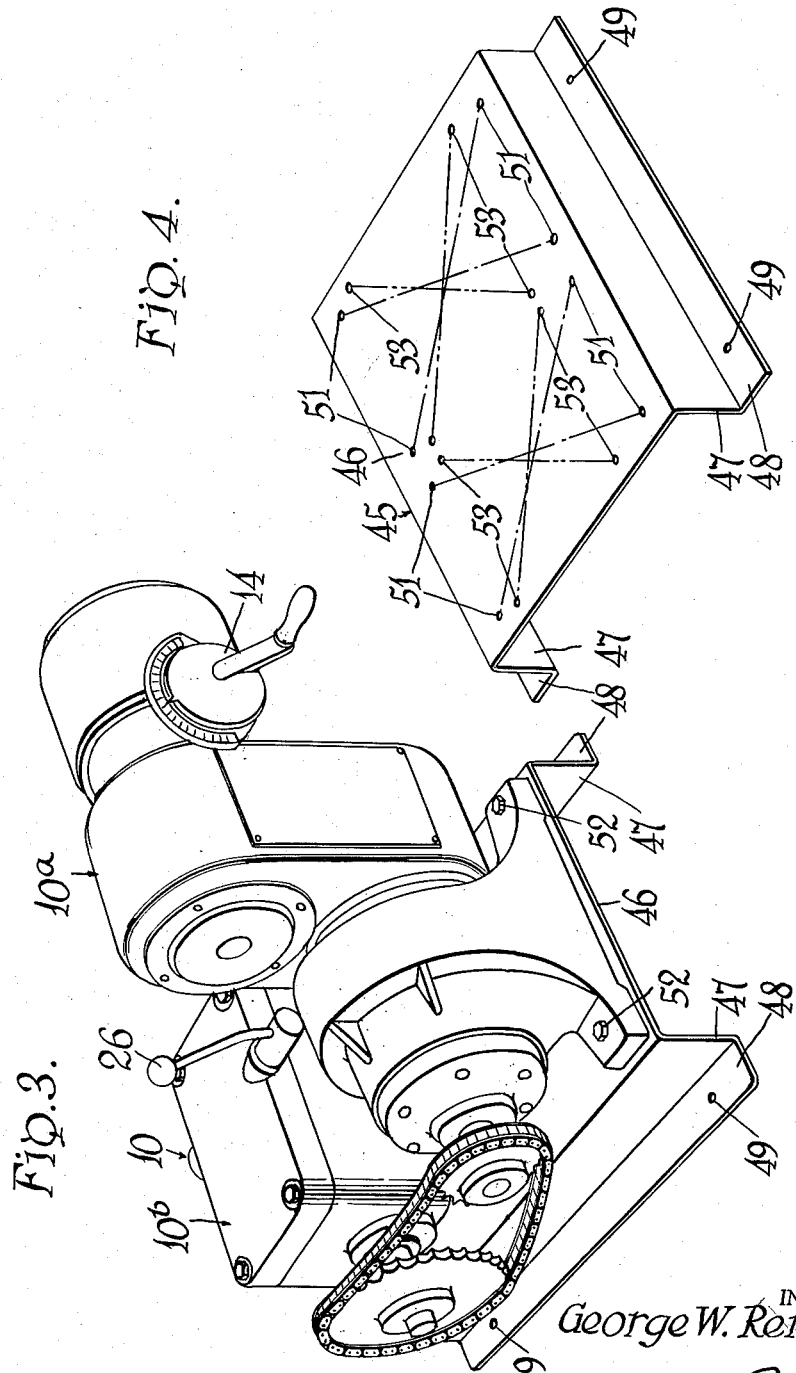
INVENTOR
*George W. Rengert,*
BY *Raymon E. Rousseau*
ATTORNEY

United States Patent Office 2,974,546
Patented Mar. 14, 1961

2,974,546

CONSTANT REDUCED SPEED DRIVE UNIT

George W. Rengert, West Falls, N.Y., assignor to Root Neal and Company, Buffalo, N.Y., a corporation of New York Filed Oct. 14, 1959, Ser. No. 846,429

2 Claims. (Cl. 74—745)

My invention relates to variable speed drive mechanisms and more particularly to a compact motor driven variable speed reducing drive mechanism unit adaptable to drive other mechanisms at selected predetermined and uniform slow rates of speed each within the efficient torque range of the driving motor and adaptable to allow selecting the desired speed while the driven mechanism is stationary.

The drive unit of the present invention is particularly well adapted for use in systems for mixing or blending predetermined quantities of a number of different materials to provide a desired mix. In such systems a suitable bin or hopper for each of the different materials is located above a suitable conveyor, and the bottom of each hopper is provided with drivable means for feeding the material from the hopper and onto the conveyor. A satisfactory form of such material feeding means comprises a plurality of parallel spiral conveyor screws each formed, arranged and driven in a manner calculated to uniformly feed the material from the bin at a desired rate and to prevent it from becoming stagnant.

In the continuous feeding of different materials, to provide blends or mixes, formed of a multiplicity of different ingredients used in producing edible products, for example bread, cake and cookie flours, known as ready mixes, it will be apparent that in order to provide a suitable mix for a desired product the percentage or proportion of each material to the total mix must be held within close limits, otherwise the blend or mix would vary and the product produced therefrom would be unsatisfactory. Furthermore unless the rate of feed of each ingredient is held within close limits the resulting mix may be unuseable and large scale production of a desired mix is very difficult if not impossible.

Prior drives used to drive said hopper feeding mechanisms have not been satisfactory because, due to inherent fluctuations in such drives, they have not been able to hold the feeding rate of the materials of the blend or mix within the necessarily close limits which are essential to provide a satisfactory product. It will be obvious that unless the rate of feed of each of the materials of the blend or mix, especially those materials which form a small percentage or proportion of the mix are held within close limits, the quality and character of the mix desired cannot be produced.

Therefore one object of the present invention is to provide a simple and relatively inexpensive compact motor driven variable drive speed reducing mechanism unit which will readily provide a desired range of reduced speeds, each within the efficient torque range of the driving motor and which will therefore maintain each of said speeds within close limits.

Another object is to provide such a variable drive mechanism with means operable during its operation to allow selecting a constant desired speed and with means operable during such speed selection to prevent driving the feed mechanism, whereby an operator can preset and select a desired rate for driving each feeding mechanism without driving said mechanism, thereby avoiding the waste of materials which would result if any of the feeding mechanisms were driven during the selection of its predetermined driven rate.

Another object is to provide a plurality of such selective drives which can each be individually preset independently of each other for driving an associated feeding mechanism at a predetermined rate of feed and which can all be started and stopped simultaneously.

Another object is to provide a compactly arranged selectively variable constant speed unitary drive mechanism wherein the output shaft of a first drive unit may be operably connected to the input shaft of a closely adjacent second drive mechanism in a manner allowing changing the drive ratio between said first and second mechanisms and the output shaft of the second drive mechanism may be operably connected to the input shaft of a closely adjacent driven mechanism in a manner allowing changing the drive ratio therebetween, thereby to provide for driving the driven mechanism at a number of pre-selected constant speeds.

Another object is to provide a base plate formed to allow different unitary arrangements of the first and second drive mechanisms thereon.

These and other objects of the present invention will appear from a perusal of the following detailed description presently preferred form of the invention and the drawings, wherein:

Figure 1 is a top plan view of a right hand drive unit constructed in accordance with the principles of the present invention and operably connected to a right hand material feeding mechanism. Figure 1 also indicates how a left hand drive unit may be arranged and operably connected to drive a left hand material feeding mechanism which is located closely adjacent the right hand material feeding mechanism.

Figure 2 is a side elevational view of the right hand drive unit shown in Figure 1.

Figure 3 is a rear perspective view of a left hand drive unit.

Figure 4 is a perspective view of the base plate of the unit formed with a plurality of bolt receiving through holes located to allow arranging the component elements of the drive to provide right and left hand drive units.

Figure 1:
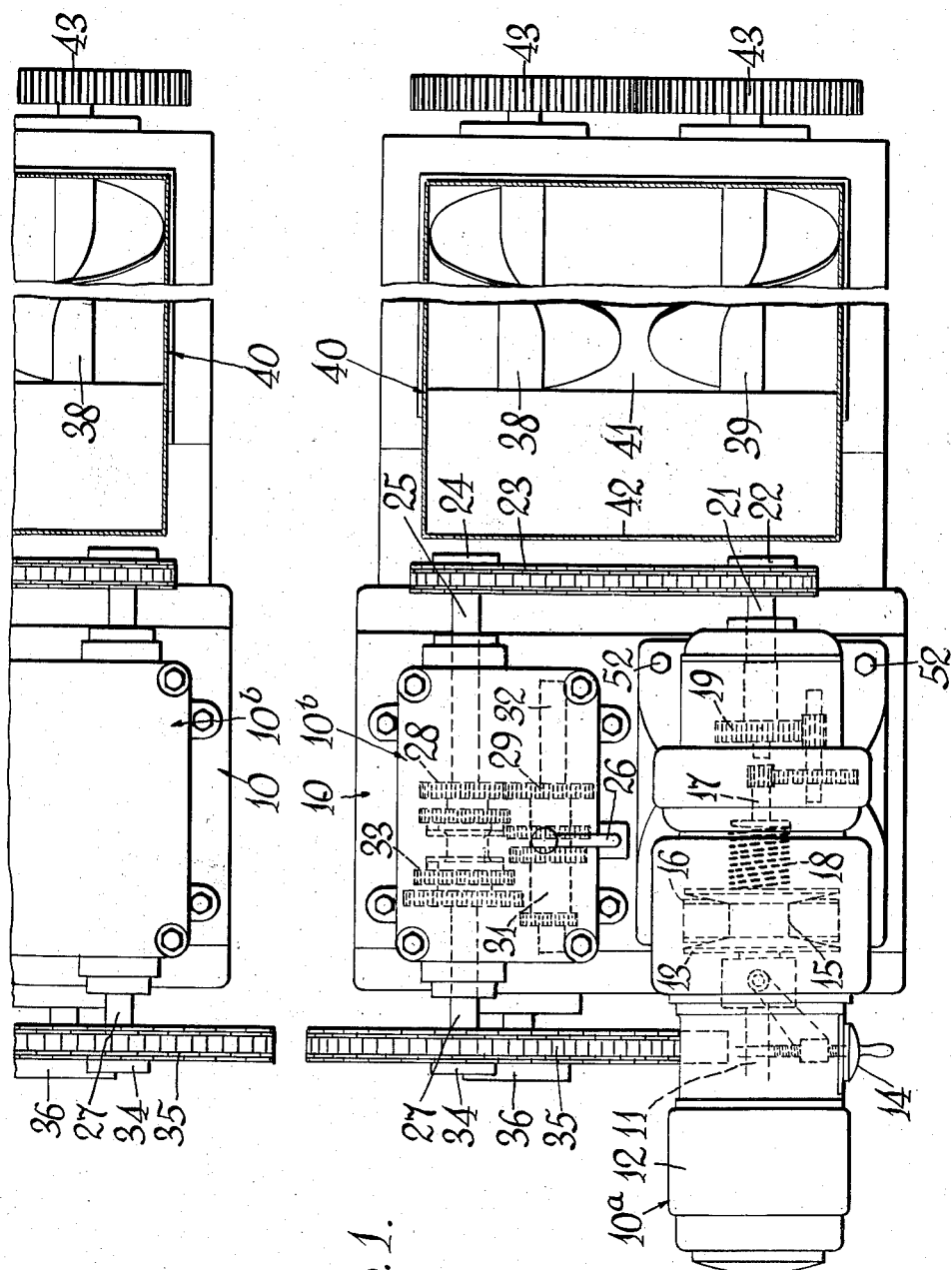

Briefly stated the present invention resides in selecting, modifying and combining a plurality of well known types of drive mechanisms in either a right hand or left hand compact drive arrangement upon a base plate and operably connecting the output shaft of said drive unit to a feeding mechanism, thereby to drive said feeding mechanism at a reduced selected speed within the efficient torque range of the unit driving motor.

Referring now to the drawings, wherein a presently preferred form of my invention is illustrated, the numeral 10 generally designates a complete selectable speed reducing drive unit operably connected to a material feeding mechanism 40.

The unit 10 comprises a well known type of selectable speed first drive mechanism 10a wherein the drive shaft 11 of a constant speed electric motor 12 carries and drives an expansible two-part variable pitch diameter pulley 13. A manually operable control means 14 is operably connected to one part of the pulley 13 to selectively move said pulley part toward and away from its other part thereby to change its pitch diameter with which a belt 15 engages. The belt 15 also engages another two-part pulley 16 which is carried by a shaft 17 and which has one part fixed upon the shaft 17 and its other part slidably secured thereupon and resiliently urged toward said one part by a spring 18, whereby it is automatically expanded or contracted by the belt 15 in proportion to the contraction or expansion of pulley 13, thereby providing a selectively variable drive and speed ratios between the shaft 11, pulley 13 and the shaft 17, pulley 16.

The drive mechanism 10a, in order to provide a further speed reduction, has its shaft 17 geared to a train of reduction gearing which is indicated by the numeral 19 and which includes an output shaft 21, so that by manually adjusting the control means 14, the shaft 21 may be driven at selected reduced speeds.

The output shaft 21 has a sprocket 22 secured thereon and by means of a chain 23 drives a sprocket 24 secured to the input shaft 25 of a selective gear reduction mechanism 10b.

The mechanism 10b is of a well known type, except that it includes specially designed gears to withstand the higher torque loads resulting from the slow speeds thereof and a neutral position under the control of a manually operable shifting mechanism indicated by the numeral 26. In this mechanism the input shaft 25 is axially alined with but rotatable independently of the output shaft 27 and is provided with a gear 28 which is constantly meshed with and drives a gear 29 of a unitary cluster of different pitch diameter gears 31 rotatably secured upon a stub shaft 32. Another unitary cluster of gears 33, each of a pitch diameter to mesh with one of the gears of cluster 31 is slidably secured on the output shaft 27.

The spacing of the gears of each cluster is such that the cluster 33 may be shifted by the shifting mechanism 26 from the neutral non-driving position, indicated in Figure 1, to mesh each of its gears with a companion gear of the cluster 31, thereby providing for the selection of several predetermined gear reductions.

It will be understood that while the drive ratios between the companion gears of the gear clusters 31 and 33 are predetermined, they are driven by the selectively variable speed mechanism 10a so that by simply adjusting said mechanism to vary the speed at which the companion gears are driven a continuous uninterrupted series of reduced drive speeds within the range of the drive unit 10 is readily obtained. Furthermore, the unit may be adjusted so that every speed within its range comes within the efficient torque range of the driving motor, thereby providing a constant selected drive speed.

A small sprocket 34 secured to the output shaft 27 is connected by a chain 35 to drive a large sprocket 36 secured to a shaft portion 37 of one of a pair of conveyor members 38 and 39, which need not be described in detail other than to say that the screw conveyors 38 and 39 are journaled for rotation in closely spaced parallel relation in a base chamber portion 41 located beneath a material receiving bin portion 42 and are geared together as at 43 to cooperate in feeding material from the bin portion 42 through the portion 41 to a chute 44, through which it falls upon a suitable conveyor "C" to be carried to a remote point and mixed with other materials.

It is of course essential that the speed of feeding the different materials of a desired mix must be carefully selected and held within close limits otherwise the desired mix cannot be obtained.

A characteristic of the mechanism 10a is that its output speed can be selectively varied only while it is running, therefore, to avoid driving the material feeding mechanism 40 during such selection, it is highly advantageous to provide the mechanism 10b with the neutral position, whereby during the selection of the speed of the mechanism 10a the mechanism 10b does not drive the mechanism 40, thus avoiding any feeding of improper amounts of a material into a mix which, since it could not be used, would be wasted.

Assuming that the maximum reduction of the drive mechanisms 10a and 10b has been selected, the maximum reduction of the drive unit shown in the drawings is in the order of 56–1, however it will be apparent that the drive mechanism 10a may be readily varied to select lesser speed reductions, that the mechanism 10b may be provided with different gears to provide greater or lesser speed reductions and that the chain and sprocket drives between the mechanisms 10a and 10b and between the mechanism 10b and the material feeding mechanism 40 may be readily changed to provide other speed reductions.

By reason of the above noted possible drive variations it will be obvious that the drive unit of the present invention will provide a number of desired reduced drive speeds and that such speeds may be each selected to be within the efficient torque range of the driving motor, whereby the drive unit will drive the material feeding mechanism 40 at a constant rate of feed.

Because of the limited space available in many material mixing systems it is important that the drive unit 10 occupy a small amount of space. It is also desirable that right and left hand drive units be provided.

Accordingly the drive unit 10 preferably includes a channel shaped sheet metal mounting member 45 upon which the drive mechanisms 10a and 10b may be secured to provide the right hand drive units shown in Figures 1 and 2 and the left hand drive unit shown in Figure 3. As best shown in Figure 4 each side of a top plate portion 46 of the member 45 is formed with a depending upright flange 47 terminating in an outturned base flange 48 provided with bolt holes 49 to receive bolts 51 by means of which the member 45 is secured in place. The top plate 46 is formed with spaced bolt holes 51 grouped at each end thereof, as indicated by dot and dash lines, to allow the drive mechanism 10a to be selectively secured thereupon as by bolts 52 and is formed with bolt holes 53 grouped at each end thereof, as indicated by the double dot and dash lines, to allow the drive mechanism 10b to be selectively secured thereupon.

A conventional wiring circuit not shown is provided to start and stop each of the drive units 10 independently of the other units and to start and stop all of the drive units simultaneously, whereby each drive unit may be operated and adjusted, in the above described manner, independently of the other units, thereby to drive the associated material feeding mechanism at the predetermined desired rate of feed, and whereby all of the drive units may be started simultaneously to provide the desired blend or mixture of materials, and whereby upon completion of the runs all of said drive units may be stopped simultaneously to avoid any waste of the materials.

It should be understood that the herein shown and described form of drive unit is intended to exemplify the principles of the present invention and that various modifications and rearrangements of its component parts may be made within the scope of the appended claims, wherein I claim:

1. A compact unitary drive mechanism adaptable to drive at selected constant speeds any one of a number of material feeding mechanisms of an apparatus for proportioning and mixing a number of different materials to provide a desired blend of said materials, comprising a base plate directly securable upon any one of the material feeding mechanisms, a first selectively variably speed reducing drive mechanism driven by a constant speed motor, said first drive mechanism being directly secured upon one end portion of the base plate and including speed reducing drive means selectively operable to drive an output shaft at selected reduced speeds, a second selectively variable speed reducing mechanism directly secured upon the opposite end portion of the base plate, said second mechanism including a plurality of pairs of selectively engageable and disengageable companion gears, a single manually operable means for engaging and disengaging said gears, a single input shaft and a single output shaft, selected chain and sprocket means operably connecting the output shaft of the first mechanism to the input shaft of the second mechanism and selected chain and sprocket means operably connecting the output shaft of the second mechanism to the material feeding mechanism, thereby to further increase the range of constant reduced speeds obtainable from the drive unit, whereby upon operably connecting suitably selected chain and sprocket means between the first and second mechanisms and between the second mechanism and the material feeding mechanism, selecting the speed of the first mechanism and operably connecting a selected pair of the companion gears by operating the single manually operable means the drive unit may be operated to drive the material feeding mechanism at a selected constant reduced speed.

2. A compact unitary drive mechanism as set forth in claim 1 wherein the base plate is formed as an inverted U-shaped channel having each of its leg portions formed with an outwardly extending foot portion for mounting and securing it upon the material feeding mechanism, and having its leg connecting web portion formed with one set of openings located to receive means for securing the first and second mechanisms thereon in a right hand position, and formed with another set of openings located to receive means for securing said mechanisms thereon in a left hand position.

References Cited in the file of this patent

UNITED STATES PATENTS

| | | |
|---|---|---|
| 1,961,809 | Wood | June 5, 1934 |
| 2,132,951 | Hall | Oct. 11, 1938 |
| 2,280,652 | Lamond | Apr. 21, 1942 |
| 2,489,725 | Rutemiller | Nov. 29, 1949 |
| 2,621,545 | Karig | Dec. 16, 1952 |